United States Patent Office 3,621,639
Patented Nov. 23, 1971

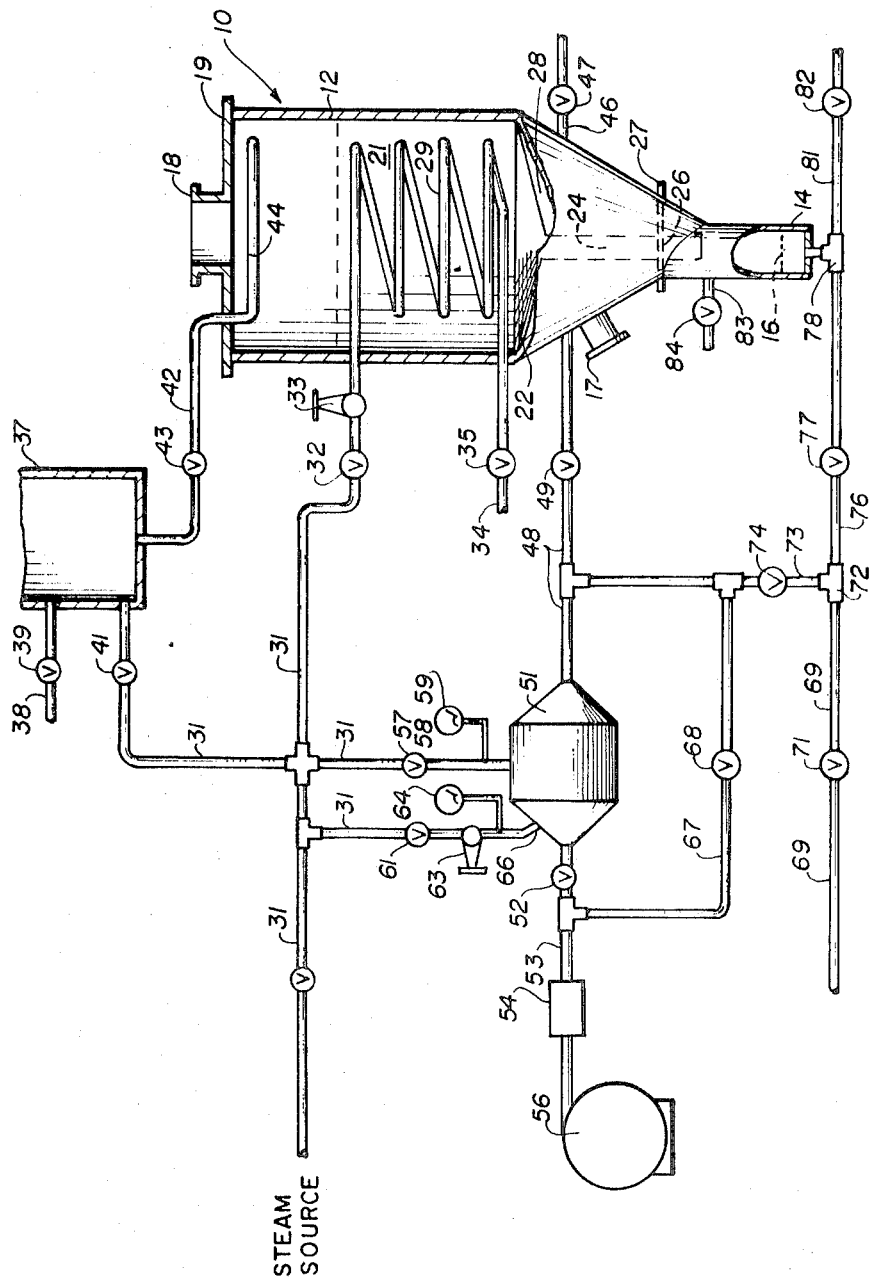

3,621,639
DUST FILTER APPARATUS UTILIZING GRANULAR SOLID FILTER MEDIA
Edwin F. Edwards, Whittier, Jun Fukuzawa, Monterey Park, and Robert L. Solnick, Newport Beach, Calif., assignors to the United States of America as represented by the United States Atomic Energy Commission
Filed Nov. 26, 1969, Ser. No. 880,040
Int. Cl. B01d 25/06
U.S. Cl. 55—243
5 Claims

ABSTRACT OF THE DISCLOSURE

Apparatus for filtering dust from a stream of gaseous medium using granular siliceous filter media with provision for regeneration by means for immersion of media in water with controlled gas flow agitation, followed by means for drying with heated gas flow.

BACKGROUND OF THE INVENTION

This invention arose in the course of or under Contract No. AT(10-1)-883 with the United States Atomic Energy Commission.

The present invention relates generally to filters utilized to remove dust materials from an off-gas stream, and more particularly to an improved means utilizing and regenerating granular solid media beds for removing dust from a flowing gas stream.

In many industrial operations utilizing calciners, smelting or blast furnaces, crushing mills and the like, an exit gas stream is produced which contains large quantities of dusty and often hazardous materials. This type of exit gas stream is also often produced in various chemical process manufacturing operations, for example, where chemical rich solutions are dried and/or calcined, in grinding operations and the like wherever fine particle dust may enter an exit gas stream. Particularly hazardous off-gas streams containing dusty materials are produced, for example, in eliminating water from the radioactive wastes remaining from the processing of nuclear fuel elements, plutonium producing operations and the like, to produce solid, easily stored radioactive wastes. To eliminate air pollution and to minimize the dispersal of highly hazardous materials into the atmosphere and surrounding environment, a wide variety of filtering, centrifugal separator, electrostatic precipitation and other means are employed. However, these means ordinarily effect removal only of the larger particle size dust, leaving significant quantities of micron size dust particles, etc., therein.

On accordance with the invention, there is provided a filter which employs a solid granular medium to remove the dust. Certain types of absorbing media, such as silica gel, which is employed therein, have been employed to remove various gaseous materials from a stream of gaseous medium such as air. Such a silica gel bed requires regeneration from time to time to maintain adsorptive capacity and heretofore, no particularly satisfactory means has been available for removing dust entrapped in a granular filter media bed, in situ, in the filter or adsorber in which the medium is employed.

The present invention provides apparatus which facilitates the cleansing and regeneration of a bed of granular solid medium, in situ, in the apparatus in which adsorption and filtering take place. In such apparatus using, for example, a granular silica gel medium containing sizeable quantities of particulate material, as well as adsorbed impurities disposed in an especially adapted filter or adsorber device, the medium is regenerated by introducing a limited quantity of a fluid medium such as water to cover the bed. Thenceforth, controlled quantities of a gaseous medium such as air is bubbled in a uniformly dispersed manner, and at a carefully controlled rate, upwardly through the filter bed, in such a manner that the filter media volume is expanded somewhat, agitation of the expanded bed takes place, and the solid dust particulate material entrapped in the bed drops downwardly through the bed to be accumulated at a location where removal and disposal is convenient. Means are included which recondition the filter medium, reduce the tendency for the media to be deteriorated by detrition, decrepitation and the like, all as disclosed more fully hereinafter.

Objects of the invention are to provide improved apparatus for filtering solid particulate and other materials from a gas stream; to provide filter apparatus utilizing granular solid materials as the filter media; to provide an improved means for regenerating filter media utilized for removing particulate and other materials from a gas stream; and to provide an improved means for removing particulate material from a granular solid medium, as well as to provide a means for regenerating a solid granular media filter bed.

Other objects and advantages of the invention will become apparent upon consideration of the following description and accompanying drawing, of which the single figure is an illustration of a filter or adsorber vessel fitted with the accessory equipment required for operation in accordance with the invention.

DESCRIPTION OF THE INVENTION

Dust-laden gas streams suitable for filtering in a filter cell, regenerable in accordance with the invention, may be provided in a variety of chemical processes and other industrial technologies. Generally speaking, the dust particle size is quite small, i.e., down to micron sizes, such as might be derived at the output from cyclone separators or the like, used as primary dust removal equipment. One use for which rigorous requirements exist and which admirably illustrates the efficiency of process of the present invention is in the filtering of dust including radioactive materials, volatile fission products and other materials produced incident to fluidized bed calcining of waste liquors obtained in processing long term irradiated nuclear fuels.

One such liquor typically contains large proportions of aluminum nitrate, nitric acid, nitric oxide and water vapor, together with a wide variety of the fission products including the volatile fission product, ruthenium, and minor constituents such as mercuric nitrate, mercuric oxide, sodium nitrate, etc. Due to the varied composition of such a material, the dusts produced on calcination may be seen to be representative of a wide variety of dusts produced in other technological processes. Such a liquid may be calcined as by spraying onto a fluidized alumina bed or other medium heated to a temperature of, e.g., 650 to 750° C. with a gas such as air being simultaneously blown therethrough. Reactions taking place in the bed are typified as follows:

$2Al(NO_3)_3 \cdot n\ H_2O \rightarrow Al_2O_3 + 6NO_2 + \frac{3}{2} O_2 + 2nH_2O$
$2HNO_3 \rightarrow 2NO_2 + \frac{1}{2} O_2 + H_2O$
$NO_2 \rightarrow NO + \frac{1}{2} O_2$
$Hg(NO_3)_2 \rightarrow HgO + 2NO_2 + \frac{1}{2} O_2$
$HgO \rightarrow Hg + 1/2\ O_2$ (50% conversion)
Fission product nitrates $\rightarrow$ FP oxides
$NaNO_3 \rightarrow NaNO_3$ (no change)

Large proportions of the foregoing materials in varied proportions remain as solids in the fluidized bed, but significant proportions are carried off as coarse and fine dust particles or volatiles in the off-gas. Cyclone separators or similar devices well known in the art can separate the coarse dust, and washing procedures can be used to return such material to the fluidized bed for recycle recovery. However, the very fine dust effluent from the cyclone separator, which includes any one or all of the dust materials and volatiles mentioned above, requires a much more effective means for thorough removal. In accordance with the invention, the off-gas from such a primary cyclone-scrubbing procedure or similar procedure is passed through especialy constructed silica gel bed filters, treated in a particular fashion, and which remove and retain even the very fine dust, as well as adsorbing volatile materials such as ruthenium therefrom. The dust removal procedure described hereinafter is also suitable for use in regenerating other granular filter media beds. These other materials may be zeolites, siliceous or silicate porous granular media of granular forms and bulk densities similar to those of the silica gels disclosed herein.

Apparatus utilized in operating the process of the invention will generally comprise filter cell means which includes a granular filter medium disposed therein, and having means for introducing a dust-laden gas stream into either the lower or upper portion thereof, and a clean air discharge outlet opening from the upper portion thereof. Such cell will also include means for discharging solids from the lower portion thereof, and include means for heating the filter medium bed as required in operation of the process. Means are also provided for introducing a fluid-cleansing medium such as water, and for introducing air or other gaseous medium into a lower portion of said cell to be distributed and bubble upwardly in uniform fashion throughout the bed of filter medium.

More particularly, said filter cell may be provided as a vessel 10 having a vertical cylindrical portion 12, a conical portion 13 tapering downwardly therefrom to terminate in a downwardly depending solids discharge spout portion 14. A screen 16 supports granular filter medium in spout 14. The vessel 10 is provided with the entry port 17, preferably in the conical portion 13, for introducing the dust-laden gaseous medium stream, supra, and an off-gas discharge exit port 18 provided centrally in the upper cover plate 19 of said vessel. Granular filter medium, discussed more fully hereinafter, is disposed as a bed 21 principally within the cylindrical portion 12 of the vessel 11. To provide support for the bed 21, a perforated conical plate 22 is supported peripherally by the vessel wall at the juncture of vessel portion 12 and 13. A screen, for example 20 mesh, is positioned over the perforated plate to prevent the granular material from falling into the void within conical portion 13. A conduit spout 24 is extended downward from a central opening in conical plate 22 to open into spout portion 14 of vessel 10 for withdrawing granular filter medium, when required, from below a screen 26 disposed transversely across the lower portion of conical vessel section 13 as by mounting peripherally in the flanged joint connection 27. With this arrangement, the dust-laden gaseous stream entering port 17 is introduced within the annular space 28 defined by conical wall portion 13, screen 26, spout 24, and perforated plate 22, to be distributed and flow, uniformly distributed, upward through the filter medium bed 21. Means for heating of the filter bed as required in certain operations of the process may be provided by means of the spiral heat transfer medium coil 29 disposed in heat transfer relation to the material in the filter bed. A heat transfer medium such as steam is supplied to coil 29 from manifold line 31 through valve 32 and steam pressure-temperature controller 33 to the upper turn of coil 29, while condensate may be drained from the lower turn thereof by means of line 34, controlled by means of valve 35.

Heated water required in the reconditioning and regenerating operations, disclosed more fully hereinafter, is supplied from a heated water storage vessel 37 into which water is introduced from line 38 through valve 39. The water is heated by means of steam introduced from steam manifold line 31 through valve 41 to vessel 37. Heated water from vessel 37 is conveyed through conduit line 42 controlled by means of a valve 43 to be dispersed as a fine spray from sparger ring 44 upon the upper surface of filter medium bed 21. When required, water is discharged from annular void space 28 through drain line 46, controlled by means of valve 47. Also as required in the process described hereinafter, air is supplied from an inlet line 48 controlled by a valve 49 into the annular volume 28, wherefrom the air is distributed uniformly by perforated plate 22 to flow upwardly through the filter bed 21. Since humidified air is required in certain of the operations, air inlet line 48 is connected to an air heater 51, thenceforth through valve 52, through air line 53 having flow regulating orifice 54 connected therein to a centrifugal fan 56. Steam from manifold 31 is fed into air heater 51 through a valve 57 by means of a steam line 58 having a steam pressure gauge 59 coupled thereto. Steam required for humidifying air within the air heater 51 is supplied from steam manifold 31 through valve 61 to line 62, having steam controller 63 and gauge 64 connected therein to be discharged through orifice 66 into the stream of air passing through the air heater 51. Also, since cool air is required for certain of the operations, a by-pass line 67 is connected from air line 53 to line 48, through a valve 68. High pressure air is also supplied from a positive displacement blower (not shown) through line 69, valve 71 to one leg of T 72, one other leg of which leads through line 73 controlled by valve 74 to connect with by-pass line 67. The second outlet leg of T 72 connects through 76, controlled by valve 77, connected by means of T 78 into the lower end of vessel portion 14. A drain for the lower portion of vessel 14 is provided by means of a line 81 connected to the remaining leg of T 78 and controlled by means of valve 82. Solids from said lower vessel portion 14 may be removed by means of a drainline 83 connected near the upper portion of vessel spout portion 14 from which discharge is controlled by means of a valve 84.

Granular silica gel, in mesh sizes in the range of about 2–15, convenient for filter use, is the medium preferred for use in processing dust-laden gas streams. However, it is considered that other porous granular inorganic solid media, such as zeolites, ceramic or siliceous bodies, etc., having granular particle sizes, large surface area-to-mass ratios, equivalent densities and textures, and other structural physical properties comparable to those of silica gels may also be used, particularly where only physical entrapment of dust is needed or desired. Siliceous, i.e., silica-silicate type granular inorganic solid media are in general preferred for practice of the invention. The dust removal regeneration procedure disclosed herein can also be applied to such other materials. The density of the medium, per se, may be in the range of, e.g., 1 to 5, but the bulk density may vary over a wide range, dependent on porosity and particle size of the granules, e.g., 20 lbs./cu. ft. to 100 lbs./cu. ft. Silica gel for use herein should be decrepitation and attrition resistant to provide long life in repeated regeneration re-use cycles. Commercially available silica gels are generally deficient in decrepitation and attrition resistance; however, procedures have been discovered and are disclosed hereinafter for vastly improving such characteristics of silica gel to provide for economical and extended operation. Silica gel is an amorphous form of silica, formed for example by dehydrating silicic acid prepared, e.g., by acidifying a sodium silicate solution.

The bed 21 of filter media, i.e., silica gel granules is initially introduced into the bed by gentle gravity flow, since even an air transport system was found on occasion to produce excessive attrition and dusting. A bed 23 inches deep has been found to remove at least 98% of fine dust of the character described, and a bed 36 inches deep of 6–12 mesh silica gel provides an ample margin of safety for most purposes, even where extremely difficult dust removal conditions are present.

Even the best silica gel commercially available, is not notably decrepitation resistant when heated and contacted with water such as may occur if condensate or scrub water is contacted with the heated material. For example, a small sample of dry commercially available decrepitation-resistant silica gel was contacted with water at room temperature. No violent fracturing was observed. However, heated particles were observed to split apart into halves and quarters. It was also noted that the decrepitation-resistant silica gel was quite soft compared with the conventional grades. This would seem to favor the generation of fines.

Moreover, the decrepitation of fresh silica gel was found to be extremely sensitive to the degree of saturation with water. Samples of such a silica gel saturated to various degrees were placed on a flat surface in the laboratory and contacted with liquid water at room temperature and observed for decrepitation. The moisture content of the silica gel samples contacted with liquid water was determined by noting the change in weight after heating to 400° F. The results of the test are as follows:

TABLE I

| Sample No. | Percent saturated | Percent H₂O | Remarks |
|---|---|---|---|
| 1 | 100 | 40.5 | No decrepitation. |
| 2 | 97 | 39.2 | Do. |
| 3 | 94 | 38.1 | Incipient decrepitation. |
| 4 | 89 | 36.2 | Decrepitation. |
| 5 | 87 | 35.2 | Do. |

TABLE II

| Silica gel temp., °F. | Percent saturated | H₂O temp., °F. | Remarks |
|---|---|---|---|
| 77 | 100 | 158 | No decrepitation. |
| 77 | 100 | 77 | Do. |
| 77 | 100 | 212 | Do. |
| 194 | 100 | 77 | Do. |
| 194 | 100 | 39 | Do. |
| 77 | 95 | 158 | Decrepitation. |
| 77 | 95 | 41 | Do. |

It will be evident that saturation with water to above about 95% is necessary to avoid decrepitation. Regulation of the operating temperature to certain levels above the dew-point at the pressure involved can achieve this effect as noted hereinafter.

Furthermore, it was found that a vast improvement in decrepitation and thermal shock resistance was produced by continued recycling in the regeneration and conditioning procedure, described hereinafter, as shown by tests summarized in Table III, with some decrease in water adsorption capacity as shown in Table IV, but with no significant reduction in filtering capacity, either for dust or for adsorbing volatiles such as ruthenium.

TABLE III

| Number of cycles | Average silica gel temp., °F. | H₂O temp., °F. | Remarks |
|---|---|---|---|
| 10 | 300 | 70 | Incipient decrepitation. |
| 10 | 70 | 70 | No decrepitation. |
| 16 | 300 | 70 | Do. |
| 20 | 400 | 70 | Do. |
| 30 | 400 | 70 | Do. |

Water adsorption capacity

The table below shows the effect of the number of operating cycles on the ability of silica gel to adsorb water.

TABLE IV

| Number of operating cycles | Percent water adsorbed (dry basis) |
|---|---|
| 0 | 40 |
| 10 | 33 |
| 16 | 30 |
| 20 | 30 |
| 30 | 27 |

To minimize decrepitation and formation of dust, the adsorption cell should be operated at a temperature in the range of about 5 to 15° F. above the dew-point at the pressure existing in the cell, to prevent condensation and dripping of condensate onto the adsorbent. Moreover, the filter medium should be saturated with water by contact with humidified air at the operating temperature, either before initial use or in the course of regeneration as described hereinafter. It will be appreciated that recycling progressively improves the decrepitation resistance so that less rigid control of operating conditions is permitted by the use of adsorbent so conditioned.

More particularly, a granular silica gel bed such as 21 above is preconditioned prior to initial use or prior to regeneration by saturating the silica gel with water by contact with humidified air. In the apparatus above, humidified air or similar gas is produced in air heater 51, by introducing steam from nozzle 66 to approach saturation, as noted above, and is introduced through line 48 into cell vessel 10 to flow upwardly through bed 21, e.g., at about 150° F. Saturation, i.e., with about 40% by weight of water dry basis of silica gel, may require from 1½ to 3 days at 0.3 feet per second (f.p.s.) per square foot of flow area.

A preconditioned silica gel granule bed or other solid inorganic filter medium granule bed, installed in apparatus of the type disclosed, is then employed to filter fine particle size dust, radioactive effluent and the like from a gas stream. Maximum loading that can be tolerated is indicated by excessive back pressure in the gas stream, at which time flow is terminated and, if desired, transferred to another similar filter apparatus.

A dust-laden bed of granular filter medium, e.g., a preconditioned silica gel bed 21, is treated for dust removal by introducing water into the filter vessel to at least cover the bed, e.g., about 3 volumes of water to one of filter media, as through line 42, from vessel 37, preferably with the water at a temperature near that of the silica gel, i.e., within about 10–15° F. to minimize decrepitation. Other media, including recycled silica gel, may tolerate a greater temperature difference.

Initial attempts to remove dust by flushing from above were notably unsuccessful in that only a portion of the dust could be removed. However, introduction of a gaseous medium such as air as through line 48 to bubble upwardly at controlled rates through the water-immersed filter bed most effectively removes the dust. Short bursts of air, e.g., up to two minutes each with an over-all gross bed velocity of 0.15 to 0.2 f.p.s. and 15 volumes of water were found quite effective. However, with only three volumes of water and a longer period of agitation, e.g., air at 0.15 f.p.s. for ten minutes, equivalent results were obtained and a lesser volume of effluent from drain 46 need be handled. Of course, the wash treatment could be repeated if dust removal in some instances was found to be recalcitrant. Subsequent to draining off the dust-laden effluent wash water, the bed is dried by blowing warm dry air from air heater 51 through the bed 21 with auxiliary heating from steam coil 29.

The foregoing treatment is found to be particularly beneficial in that the regenerated bed has a lower pressure loss than does a new bed. This may be due to the fact that the bed volume is expanded of the order of 10% by the air agitation. It may be noted that such an expansion also gives a qualitative test as to the flow rate of air required for effective agitation. The reason for the effectiveness of dust removal is not fully understood. On first impression, one might assume that the agitation would maintain the dust in suspension in the bed. However, in practice the dust and adsorbed materials such as ruthenium are effectively removed with the effluent wash water, and can be disposed of by procedures known in the art.

A fresh bed was found to have a pressure drop of 0.09 in H₂O per inch of bed thickness at a bed velocity of 0.3 f.p.s. Dust of the type mentioned above, depositing 0.0186 lbs./ft.²/day was found to produce a rapid increase in pressure drop after about 25–30 days, whereupon regeneration was considered advisable. Regeneration upwards of 30 cycles is considered typical.

Bench scale laboratory test results, presented hereinafter, further illustrate the teachings of the invention.

DESCRIPTION OF APPARATUS

Bench scale tests

Basically, the system consisted of an instrumented bed of silica gel with an air supply conditioned to simulate the prototype plant operation.

Silica gel bed.—The silica gel was contained in a galvanized sheet metal vessel 6 in. in diameter x 30 in. long. The vessel was equipped with three 2-inch diameter Plexiglas observation windows. A screen made of 18-gauge wire placed 0.02 in. apart was used to hold the silica gel in place. This unusual screen was intended to simulate grid 22.

Air system.—The air system consisted of a dry, filtered laboratory air supply, orifice meter, saturator, and heater. The air was metered upstream of the saturator by an 0.3-inch sharp-edged orifice in a 1-inch pipe equipped with flange taps. The saturator was a column 6 inches in diameter x 30 in. long packed with 2-inch Raschig rings. Heated water (130°–150° F.) flowed countercurrent to the up-flowing air. The water temperature, and hence the outlet air dewpoint, was controlled by a thermostat-solenoid valve system on the water heating coil. Plant steam was used as the heat source.

Dust system.—The dust injection apparatus was designed so that a known amount of finely dispersed dust could be injected into the main air stream. It consisted of an air supply and metering system, dust reservoir, and a fines-separating cyclone.

The dust used to simulate the prototype plant conditions was made up of finely ground alumina prills obtained from a nuclear fuel process calciner, using liquid of the type described above. Microscopic inspection of particles taken at the cyclone discharge showed the following approximate particle size distribution:

| | Percent |
|---|---|
| Over $10\mu$ (microns) | 10 |
| $5–10\mu$ | 30 |
| $1–5\mu$ | 50 |
| Less than $1\mu$ | 10 |

Filters.—The filtering efficiency of the silica gel bed was determined by noting the weight gain of an AEC-type absolute filter placed at the bed discharge. The filter used fas this test was obtained from the Cambridge Filter Corporation and carried their designation, "Model 1F-25." The filter had a face dimension of 6 x 6 in. and was 2¾ in. deep. It had a nominal rating of 30 c.f.m.

Operation

The following is a description of the operation of the bench scale apparatus. The purpose of this test was twofold: (1) to determine the dust-holding characteristics of a silica gel bed as a function of the number of operating cycles, and (2) to develop a wash and dust removal procedure. The general procedure described in more detail below are as follows:

(1) Weight and install filter
(2) Warm up bed
(3) Inject dust
(4) Saturate bed
(5) Remove and weight filter
(6) Wash bed
(7) Dry bed Filter installation.—Prior to the initiation of each test, a dried USAEC-type absolute filter was carefully weighed and installed. The filter was kept in an oven at 160° F. for a minimum of twleve hours before installation to reduce whatever errors might occur from moisture contained in the filter media.

Bed warm-up.—The silica gel wasb rought up to operating conditions, 140° F. dew-point and 150–200° F. dry bulb, from a cold start, 70° F., in approximately eight hours. The purpose of this slow warm-up was to prevent condensation of liquid water on the unsaturated silica gel. The air dew-point was controlled by varying the saturating water temperature which, in turn, was controlled by a thermostatically-actuated steam heating coil. The air dry bulb temperature was controlled by an electric heater placed at the saturator discharge.

Dust injection.—After the bed was warmed up, the dust injection cycle was started. The procedure was as follows: At the beginning of each operating day, 50 grams of finely ground alumina dust was placed in the 200 ml. flask which served as the dust reservoir. The dust reservoir, which was connected to a metered air supply, was placed over a magnetic stirrer. The magnetic stirrer created a small cloud of dust which was then swept out by the injection air stream. This dust was carried into the cyclone where all but the fines were separated. The air leaving the cyclone containing the fines was then injected into the main air stream between the saturator and the silica gel bed. The rate at which the dust was injected into the main air stream was controlled primarily by the magnitude of the injection air rate.

At the end of each operating day, the dust remaining in the reservoir and the cyclone was weighed so that the net amount injected could be determined. Average daily rates were usually between 5 and 10 grams. The dust injection was continued until the pressure drop across the bed reached a value of four to five times that corresponding to a dry, clean bed.

Saturation.—Since normal plant operation only partially saturated the silica gel, it was necessary to complete the saturation. This was accomplished by reducing the heater output until the dry bulb temperature was very nearly equal to the dew-point, 140° F. The completeness of saturation was determined by immersing samples of silica gel taken from the top of the bed in liquid water. The saturation phase usually required about one and one-half days to complete.

Filter check-out.—When the saturation was completed, the apparatus was shut down and the filter removed. It was again placed in an oven for a minimum of twelve hours at 160° F. before weighing. The bed filter efficiency was defined as follows:

$$\text{Efficiency} = 1 - \frac{\text{Filter weight gain}}{\text{Total dust injected}}$$

Wash.—The purpose of the wash cycle was to remove (1) ruthenium, and (2) dust. Since we did not deal with ruthenium in these tests, the methods tried and described below necessarily refer to dust removal only. It is likely that any method that will adequately remove dust will also remove ruthenium.

The wash procedure used for the first test is described below in Steps 1 through 3, and is labeled "Method I" for purposes of identification.

Method I

Step 1.—Fill vessel with warm, 130–140° F., water through top spray nozzles.
Step 2.—Allow water to drain.
Step 3.—Repeat Steps 1 and 2 two more times.

Later tests proved that this procedure failed to remove the dust or to reduce the bed pressure drop. Therefore, the following new methods were tried.

Method II

Same as Method I, except that ten volumes of water were used instead of three. Result: Some improvement, but not in proportion to water used.

Method III

Continuous countercurrent flow of water and air. Result: Negative. Upflowing air held up wash water in vessel, preventing it from draining.

Method IV

Same as Method I, except that air (v.=0.15–0.20 f.p.s.) bubbled through bed prior to each draining. Results: Good. Analysis of dust content in drained water indicated most of injected dust was removed. Also bubbling air through bed filled with water tended to loosen silica gel so that volume increased 5–10%. This resulted in reduction of pressure drops from 2.0 to 1.5 in $H_2O$ below that of a new bed.

Method V

Same as Method I, except air bubbled through bed only during second filling. Air rate fixed at 0.15 to 0.20 f.p.s. Duration of agitation was varied during test. Results: Good.

Method VI

Same as Method V, except air velocity reduced to 0.10 f.p.s.

Duration fixed at six minutes. Results: Good.

Drying.—The last step in the plant operation was the drying procedure necessary to regenerate the bed for the next operating cycle. The drying was accomplished by simultaneously passing hot, 250–300° F., air (v=0.3 f.p.s.) through the bed, and admitting steam into the heating coil immersed in the bed. The drying operation was continued for about twelve hours. When completed, the bed was allowed to cool at room temperature, 70° F., so that an air pressure drop check could be made.

FINAL INSPECTION

After the sixteenth operating cycle, the bed was removed from the vessel and inspected. The following conditions were observed. Very little dust noted in the upper two-thirds of bed. Silica gel particles in the bottom one-third of bed were coated with a thin layer of dust. The wire retaining screen appeared clean and was not clogged with fines or dust.

A screen analysis of the entire bed was made. The results are shown in Table I below.

TABLE I

| Tyler screen: | Percent by weight |
|---|---|
| through 6 on 10 | 64.7 |
| through 10 on 12 | 16.9 |
| through 12 on 16 | 13.6 |
| through 16 on 20 | 1.5 |
| through 20 on 28 | 1.1 |
| through 28 | 2.3 |

RESULTS

Pertinent test data showed that the dust filtering efficiency of the bed was in excess of 98%. Also, the optimum method of removing dust trapped in the bed is by agitating the bed for not less than six minutes at a velocity of 0.15 f.p.s.

Tests using short bursts of air (up to two minutes each) at a gross bed velocity of 0.15 to 0.2 f.p.s. with upwards of 15 volumes of water proved highly effective in removing dust. Pressure loss not only returned to normal, but fell below that of a new bed. This was attributed to the fact that the bed had been expanded some 10% by the action of the air. With the wash water quantity fixed at three volumes, air agitation for a duration of ten minutes at an average velocity of 0.15 f.p.s. provided the same results.

Pilot plant tests (using apparatus of figure)

(1) Silica gel subjected to thirty operating cycles could be removed from the vessel with no difficulty. The silica gel flowed freely through the center 4 in. I.D. downcomer; no hangup or caking was observed. The silica gel remaining within the vesesl formed an inverted cone with an angle of repose averaging between 34° and 36°.

(2) The bed pressure drop increased from 0.08 in. $H_2O$/in. bed at the start to 0.11 at the end of thirty cycles. This is based on a gross bed velocity of 0.3 f.p.s.

(3) A screen analysis of the entire charge of spent silica gel showed an increase of approximately 5% by weight of particles smaller than 16 mesh. Of this 5%, approximately 1% was less than 28 mesh.

(4) The use of a pneumatic conveying line to load the vessel leveled the bed automatically, but caused excessive silica gel attrition. The prolonged cycling tests were conducted on a fresh charge fed into the vessel by hand. Gravity feed was recommended for the full scale plant.

(5) The decrepitation characteristics changed markedly with increasing cycles. At the end of ten cycles, silica gel taken from the top of the bed could be contacted with liquid water without noticeable decrepitation. Both the silica gel and water were at room temperature.

(6) The maximum amount of water which initially dry silica gel could adsorb diminished with increasing cycyling. At ten cycles, the weight percent of adsorbed water was 33%. At twenty and thirty cycles, the weight percent of adsorbed water was 30% and 27% respectively.

While there has been disclosed in the foregoing what may be considered preferred embodiments of the invention, modifications may be made therein without departing from the teachings of the invention, and it is intended to cover all such falling within the scope of the appended claims.

What is claimed is:

1. Apparatus for filtering fine particle size dust from a flowing gaseous medium stream with regenerable granular solid filter media, comprising:
    (a) a vertically oriented elongated vessel including an entry port for introducing said dust-laden gaseous medium stream therein, and exit port means for discharging filtered gaseous medium from a portion thereof;
    (b) conical perforated screen plate means for supporting a bed of regenerable granular solid filter medium disposed within said vessel to transact the flow of the gaseous medium between said entry and exit ports;
    (c) a bed of granular silica gel filter medium disposed on said conical perforated screen;
    (d) heating means disposed in heat transfer relation to said filter bed to maintain said filter bed at a temperature of the order of about 5 to 15° F. above the dew-point during filtering operation to minimize decrepitaiton of the filter medium;
    (e) means for introducing regenerant liquid water to cover and immerse said filter bed, including means for heating said water to regenerating temperature;
    (f) means for introducing a gaseous stream into the lower portion of said vessel to flow uniformly upward through said filter bed immersed in said regenerant liquid water so that the filter media particles are agitated, the bed is expanded and dust therein descends into the lower portion of said vessel, said means including further means for heating said gaseous stream and for humidifying said stream so that said silica gel can be saturated with water to above about 95% of the fully saturated water content level to prevent descrepitation; and
    (g) port means for withdrawing dust-laden regenerant liquid water from the lower portion of said vessel.

2. Apparatus as defined in claim 1 wherein said granular silica gel filter medium has a density in the range of about 1 to 5, while the bulk density is in the range of about 20 to 100 lbs. per cubic foot.

3. Apparatus as defined in claim 1 wherein said vessel includes a conically tapered lower portion below said perforated screen terminating in a downwardly depending discharge spout and includes a transverse screen therein, wherein said entry port is located in said lower conical vessel portion to introduce said gaseous medium stream below said perforated screen, wherein a conduit depends centrally from said conical screen plate to terminate in said vessel discharge spout below said transverse screen, and wherein a valved discharge line communicates with said vessel spout portion below said transverse screen for withdrawing filter medium therefrom.

4. Apparatus as defined in claim 3 wherein a transverse screen is mounted below said discharge line in said vessel spout portion and wherein said port means for discharging dust-laden regenerant fluid communicates with said spout portion below said transverse screen mounted therein.

5. Apparatus as defined in claim 4 wherein said granular silica gel has a mesh size in the range of about 2 to 15 and said gaseous medium stream is an air stream.

References Cited

UNITED STATES PATENTS

| | | | |
|---|---|---|---|
| 1,660,642 | 2/1928 | Barnebey | 55—74 |
| 1,784,536 | 12/1930 | Pantenburg | 55—79 |
| 2,978,064 | 4/1961 | Deaver | 55—387 |
| 3,410,055 | 11/1968 | Zenz | 55—98 |
| 3,504,483 | 4/1970 | Tamura et al. | 55—180 |

FOREIGN PATENTS

| | | | |
|---|---|---|---|
| 131,198 | 8/1919 | Great Britain | 210—274 |

FRANK W. LUTTER, Primary Examiner

B. NOZICK, Assistant Examiner

U.S. Cl. X.R.

55—269, 282, 387, 474, 512